(12) United States Patent
Ciet et al.

(10) Patent No.: US 11,494,574 B2
(45) Date of Patent: Nov. 8, 2022

(54) IDENTITY DOCUMENT AUTHENTICATION

(71) Applicant: Apple Inc., Cupertino, CA (US)

(72) Inventors: Mathieu Ciet, Paris (FR); Bruno Benteo, Castanet-Tolosan (FR); Michael Mouchous, Paris (FR); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/805,214

(22) Filed: Feb. 28, 2020

(65) Prior Publication Data

US 2020/0302133 A1    Sep. 24, 2020

Related U.S. Application Data

(60) Provisional application No. 62/822,985, filed on Mar. 24, 2019.

(51) Int. Cl.
| | |
|---|---|
| *G06K 5/00* | (2006.01) |
| *G06K 7/12* | (2006.01) |
| *G06Q 30/06* | (2012.01) |
| *G06V 30/413* | (2022.01) |

(52) U.S. Cl.
CPC ........... *G06K 7/12* (2013.01); *G06Q 30/0609* (2013.01); *G06V 30/413* (2022.01)

(58) Field of Classification Search
CPC ........ G06K 7/12; G06K 9/00456; G06K 9/00; G06Q 30/0606
USPC ......................................................... 235/380
See application file for complete search history.

(56) References Cited

U.S. PATENT DOCUMENTS

| | | | |
|---|---|---|---|
| 2014/0294175 A1* | 10/2014 | Boloker | H04L 9/3247 380/30 |
| 2017/0147875 A1* | 5/2017 | Hagelin | G06Q 20/4014 |
| 2017/0147876 A1* | 5/2017 | Hagelin | G06K 9/2018 |
| 2018/0189605 A1* | 7/2018 | Wu | B42D 25/23 |
| 2018/0234420 A1 | 8/2018 | Mattes et al. | |
| 2019/0050546 A1* | 2/2019 | Hochrieser | G06K 9/00906 |
| 2020/0210796 A1* | 7/2020 | Hsu | G06F 16/93 |

(Continued)

OTHER PUBLICATIONS

Han ct al., "Content-based image authentication: current status, issues, and challenges," Oct. 2009, International Journal of Information Security, vol. 9. No 1, pp. 19-32.

(Continued)

*Primary Examiner* — Ahshik Kim
(74) *Attorney, Agent, or Firm* — BakerHostetler (57) ABSTRACT

A device implementing a system for authenticating an identity document includes at least one processor configured to receive, from a service provider, a request associated with verifying an integrity of an identity document, and capture, responsive to receiving the request, image data of the identity document. The at least one processor is further configured to generate a representation based on the image data, the representation comprising form factor data of the identity document, and compare the representation with a prior representation of the identity document, the prior representation comprising prior form factor data of the identity document. The at least one processor is further configured to provide, to the service provider, a response to the request based on comparing the representation with the prior representation.

20 Claims, 8 Drawing Sheets

(56) References Cited

U.S. PATENT DOCUMENTS

2020/0213311 A1* 7/2020 Saha ................. H04L 9/321
2021/0232843 A1* 7/2021 Xu .................. G06K 9/00463

OTHER PUBLICATIONS

International Search Report and Written Opinion from PCT/US2020/020508, dated Jun. 25, 2020, 15 pages.
European Office Action from European Patent Application No. 20716015.1, dated May 18, 2022, 8 pages.

* cited by examiner

IDENTITY DOCUMENT AUTHENTICATION

CROSS REFERENCE TO RELATED APPLICATIONS

This application claims the benefit of priority to U.S. Provisional Patent Application No. 62/822,985, entitled "Identity Document Authentication," filed on Mar. 24, 2019, the disclosure of which is hereby incorporated herein in its entirety.

TECHNICAL FIELD

The present description relates generally to identity documents (IDs), including authenticating an ID.

BACKGROUND

Some transactions require a user to present a valid ID in association with the transaction. For example, a merchant at a brick and mortar store may require a person to present an authentic ID, in order to verify that the person is of legal age to purchase a product and/or service.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In brick and mortar stores, a merchant may have experience in distinguishing an authentic physical ID from one that is not authentic. For example, a physical ID may have multiple security features (e.g., watermarks, textures, engravings, holograms) that are detectable through sight and touch of a person trained on the features. However, if an image of the ID is provided to an on-line merchant (e.g., which may be an automated service), that service may not be able to detect the security features to verify that the ID is authentic, much less verify if the purchaser is the person to whom the ID was issued.

The subject system provides for authenticating a user's physical ID with an identity provider (e.g., an issuer of the ID) to create an electronic ID for a given service or domain of services. During an enrollment phase, the user's device captures image(s) of the ID (e.g., a driver's license, passport, or the like) and sends the image(s) to an issuer of the ID (e.g., an agency that issued the ID, such as an agency that issues driver's licenses), and/or a third party verification service that is capable of verifying the authenticity of the ID. In one or more implementations, the user's device may capture multiple images of the physical ID, such as an infrared (IR) image and a red-green-blue (RGB) image.

The identity provider determines the authenticity of the document, for example, by confirming various security features on the ID. In one or more implementations, the identity provider may confirm that the personal data listed on the ID corresponds to the person to whom the ID was issued, such as by checking against an agency database. After the document is authenticated by the identity provider, the identity provider may provide a signed verification that the ID has been verified. Moreover, an electronic ID may be generated (e.g., by the electronic device 102, the identity provider and/or by a server independent of the identity provider), where the electronic ID includes the user information that has been verified by the identity provider.

The electronic device may store the electronic ID and use the captured image data to generate a first representation of the ID that is stored on the device. In one or more implementations, the enrollment process may also include locally verifying user-declared (e.g. provided) identity information with identity information printed on the physical ID. In one or more implementations, the first representation may be strongly linked to the user, such as by associating the first representation with biometric information of the user, such as a fingerprint, a set of points corresponding to a scan of the user's face, and the like.

The first representation may not include the personally identifiable information of the ID. Rather, the first representation may include multiple form factors that are specific to the user's ID (e.g., the position of a common watermark relative to first/last characters in the user's name, address, date of birth, and the like). These form factors make it possible for the first representation to uniquely represent the user's ID without explicitly containing identifying information of the user. Thus, in one or more implementations, the first representation may be stored remotely without exposing any of the user's personal information.

The subject system further provides for using the first representation in verifying the integrity of a user's physical ID (e.g., with respect to on-line transactions). For example, during an on-line purchase that requires the purchaser to be a minimum age, the user may take another picture of his/her ID (e.g., a driver's license), and the device may generate a second representation of the ID. Similar to the first representation, the second representation may include various form factors of the recent picture. The device compares the first representation (corresponding to the authenticated ID) with the second representation (corresponding to the recent picture). If the two representations match (e.g., within a certain error threshold), and if biometric information of the current user of the device matches the biometric information associated with the first representation, the device may notify the merchant that the ID is valid and corresponds to the user, and the merchant may proceed with the transaction (e.g., on-line transaction).

In one or more implementations, the user's device may capture an image of the user and/or a face scan of the user at the time that the physical ID is being enrolled. The image and/or face scan may be locally used by the user's device to confirm that the user is the same person pictured in the physical ID. Since the appearance of the user's face may change over time, e.g., due to age, the user's device may periodically obtain images of the user over time (e.g., with the user's consent, such that the user's device can compute a link between a current image of the user with the image of the user captured at the time of enrollment). Similarly, the user may allow the device to access prior images of the user, e.g., in a photo library, to a link a current image of the user back to an image of the user that appears on the physical ID (which may have issued several years ago).

Figure 1:
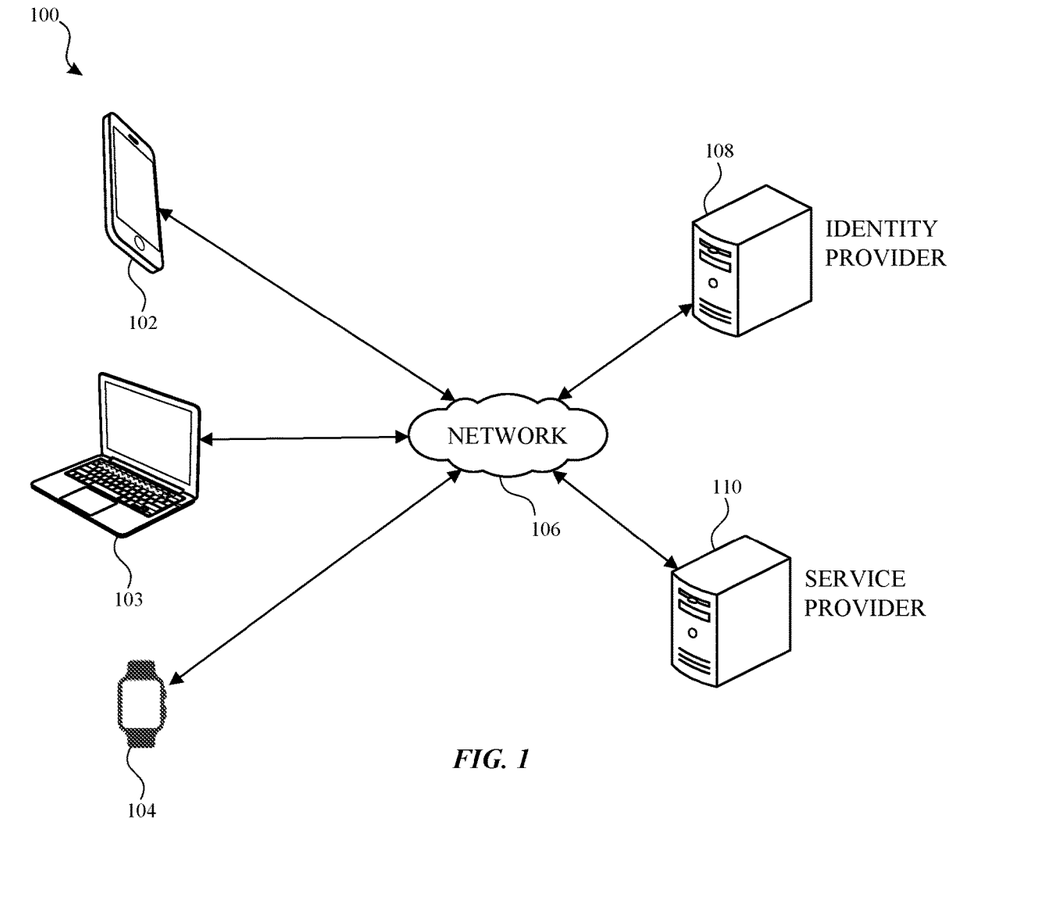
FIG. 1 illustrates an example network environment for authenticating an identity document (ID) in accordance with one or more implementations.

FIG. 1 illustrates an example network environment for authenticating an identity document (ID) and verifying the integrity of the ID in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106, an identity provider 108 and a service provider 110. The network 106 may communicatively (directly or indirectly) couple, for example, any two or more of the electronic devices 102-104, the identity provider 108, and the service provider 112. In one or more implementations, the network 106 may be an interconnected network of devices that may include, and/or may be communicatively coupled to, the Internet. For explanatory purposes, the network environment 100 is illustrated in FIG. 1 as including electronic devices 102-104, the identity provider 108 and the service provider 110; however, the network environment 100 may include any number of electronic devices and any number of servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a laptop computer, and the electronic device 104 is depicted as a smartwatch. Each of the electronic devices 102-104 may be, and/or may include all or part of, the device discussed below with respect to FIG. 2, and/or the electronic system discussed below with respect to FIG. 8.

Each of the identity provider 108 and the service provider 110 may be, and/or may include all or part of the device discussed below with respect to FIG. 8. Each of the identity provider 108 and the service provider 110 may include one or more servers, such as a cloud of servers. For explanatory purposes, a single identity provider 108 and a single service provider 110 are shown and discussed with respect to various operations. However, these and other operations discussed herein may be performed by one or more servers, and each different operation may be performed by the same or different servers.

As discussed further below with respect to FIG. 3, a user at one of the electronic devices 102-104 may authenticate his/her ID (e.g., a driver's license) with the identity provider 108 (e.g., corresponding to an ID issuer) via the network 106, and locally and/or or remotely store a first representation of the ID (e.g., from which user identifying information cannot be determined). At a later time, such as when participating in a transaction that requires an ID, the user's device (e.g., one of the electronic devices 102-104) may communicate with the service provider 110 (e.g., corresponding to an on-line merchant) via the network 106. The device may compare a second representation generated from a current picture of the ID with the first representation, in order to verify the integrity of the user's ID for the transaction (e.g., the on-line transaction).

Figure 2:
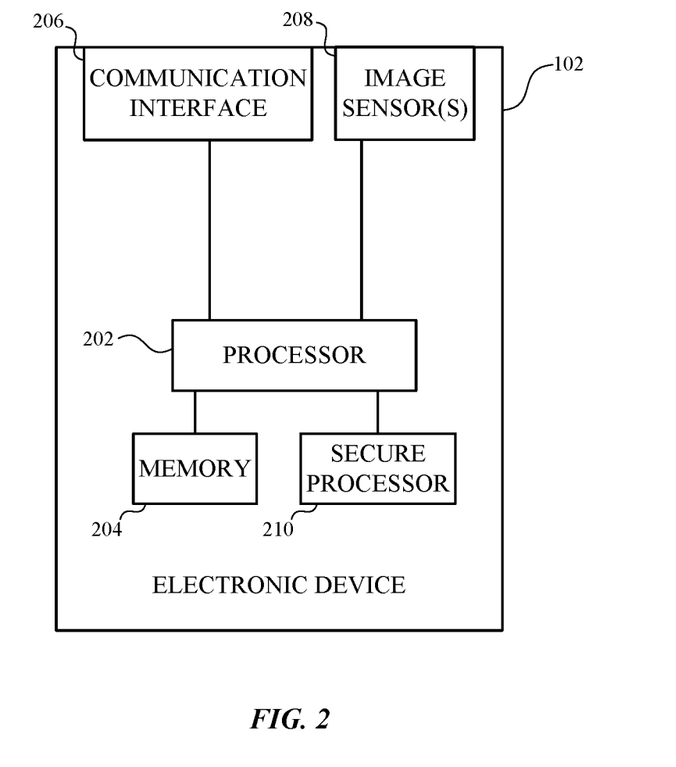
FIG. 2 illustrates an example electronic device that may implement the subject system for authenticating an ID in accordance with one or more implementations.

FIG. 2 illustrates an example electronic device that may implement the subject system for authenticating an ID in accordance with one or more implementations. For explanatory purposes, FIG. 2 is primarily described herein with reference to the electronic device 102. However, FIG. 2 may correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, a communication interface 206, one or more image sensor(s) 208 and a secure processor 210. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The secure processor 210 may be configured to securely store data and may include its own memory. For example, the secure processor 210 may correspond to a secure element or a secure enclave processor. In one or more implementations, the secure processor 210 may be configured to store representation(s) of a user's ID (e.g., a driver license, a passport, or the like) and/or a private key of a public-private key pair. As described herein, the representation(s) may include form factor information of the ID, a hash of the ID, or some other representation of the ID from which personally identifiable information cannot be determined. In one or more implementations, the representation(s) of the user's ID and/or the private key may be stored in the memory 204 using the processor 202, instead of being stored in the secure processor 210.

The communication interface 206 may include suitable logic, circuitry, and/or code that enables wired or wireless communication, such as between any of the electronic devices 102-104, the identity provider 108 and/or the service provider 110 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

The image sensor(s) 208 may be used to capture and generate image data corresponding to a subject and/or object (e.g., a physical ID). The image sensor(s) 208 may correspond to an RGB image sensor and/or an infrared image sensor. The image data captured by the image sensor(s) 208 may indicate color, depth, 2D and/or 3D characteristics of the subject.

In one or more implementations, one or more of the processor 202, the memory 204, the communication interface 206, the image sensor(s) 208, the secure processor 210 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
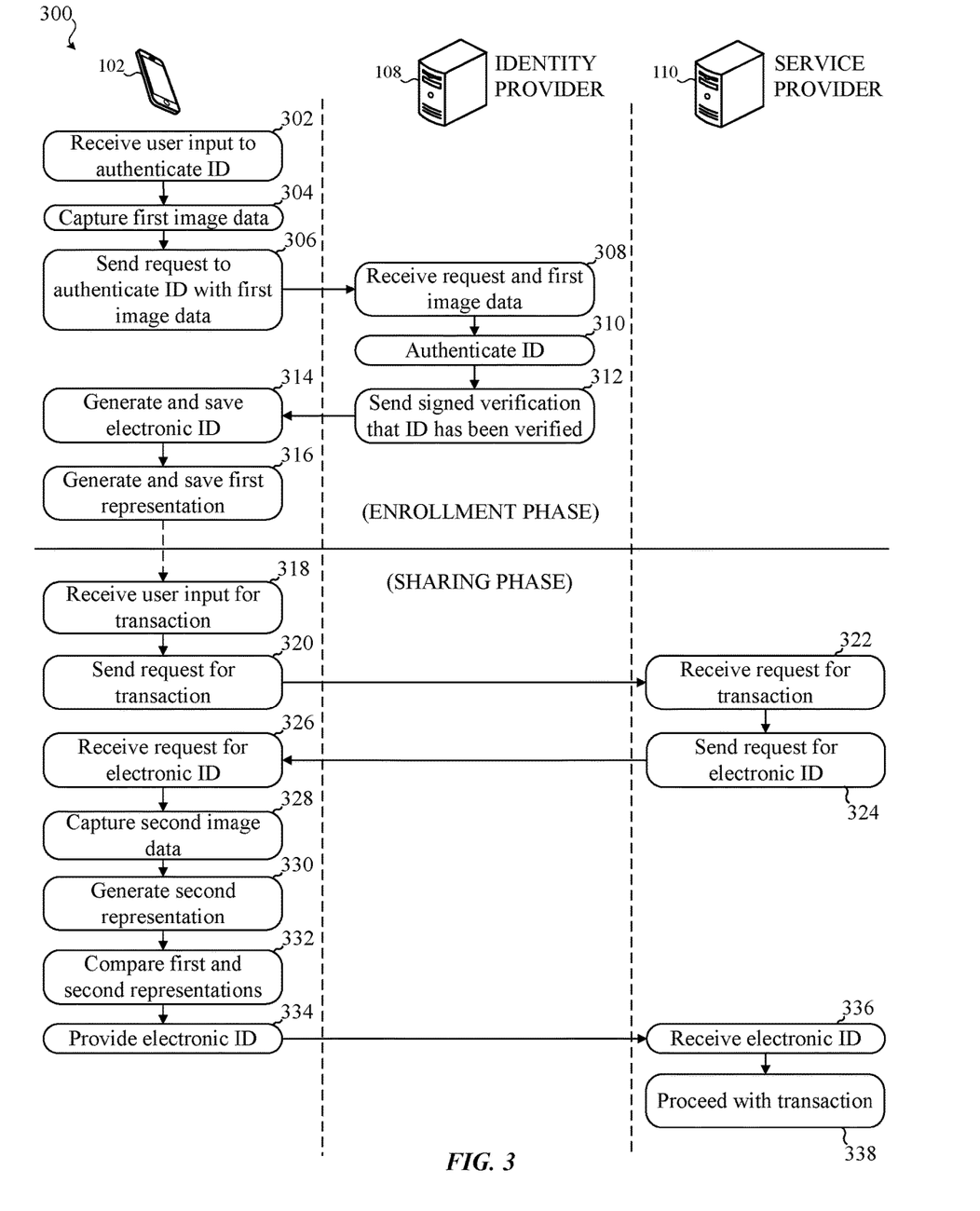
FIG. 3 illustrates an example process for authenticating an ID in accordance with one or more implementations.

FIG. 3 illustrates an example process for authenticating an ID in accordance with one or more implementations. For explanatory purposes, the process 300 is primarily described herein with reference to the electronic device 102, the identity provider 108 and the service provider 110 of FIG. 1. However, the process 300 is not limited to the electronic device 102, the identity provider 108 and the service provider 110 of FIG. 1, and one or more blocks (or operations) of the process 300 may be performed by one or more other components and other suitable devices (e.g., any of the electronic devices 103-104). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As noted above, some in-person transactions require a user to present a valid ID as part of the transaction. However, it may be difficult to verify IDs with respect to other transactions (e.g., on-line transactions, phone-based transactions). For example, some security features of an ID (e.g., 3D content such as engravings in a polycarbonate ID) may not be represented by a picture captured via the user's camera. In addition, a user may be uncomfortable with providing a picture of his/her ID to an on-line merchant (e.g., or texting/emailing the picture to a representative while communicating via phone) in association with a purchase. For example, even after the purchase is complete, it is possible for the on-line merchant (e.g., or phone representative) to store a copy of the user's picture on a server(s).

The process 300 includes an enrollment phase (e.g., blocks 302-316) and a sharing phase (e.g., blocks 318-338). During the enrollment phase, the user's ID is authenticated by the identity provider 108 (e.g., an issuer and/or third-party ID verifier), which issues a signed verification to the electronic device 102. The electronic device 102 (e.g., or the identity provider 108, or another server independent of the identity provider 108) generates an electronic ID which is locally stored on the electronic device 102. The electronic device 102 further generates a representation of the ID (from which user identifying information cannot be determined) for local storage on the device (e.g., or for storage on a remote server). During the sharing phase, the user of the electronic device 102 may use the electronic ID for on-line transactions, provided that the electronic device 102 can verify that the physical ID held by the user matches the previously-authenticated ID (e.g., based on a comparison with the stored representation of the ID).

With respect to the enrollment phase (e.g., blocks 302-316), the electronic device 102 receives user input to authenticate an ID in order to perform certain on-line transactions (302). For example, the user may select an option (presented within a user interface displayed on the electronic device 102) for enrolling in an electronic ID based on a physical ID of the user. The option may be displayed by an application specifically directed to enrolling/creating electronic IDs in order to use other applications. Alternatively or in addition, the option may be displayed within the other applications themselves, where user selection of the option may re-direct the user to the application for enrolling an electronic ID.

Figure 4:
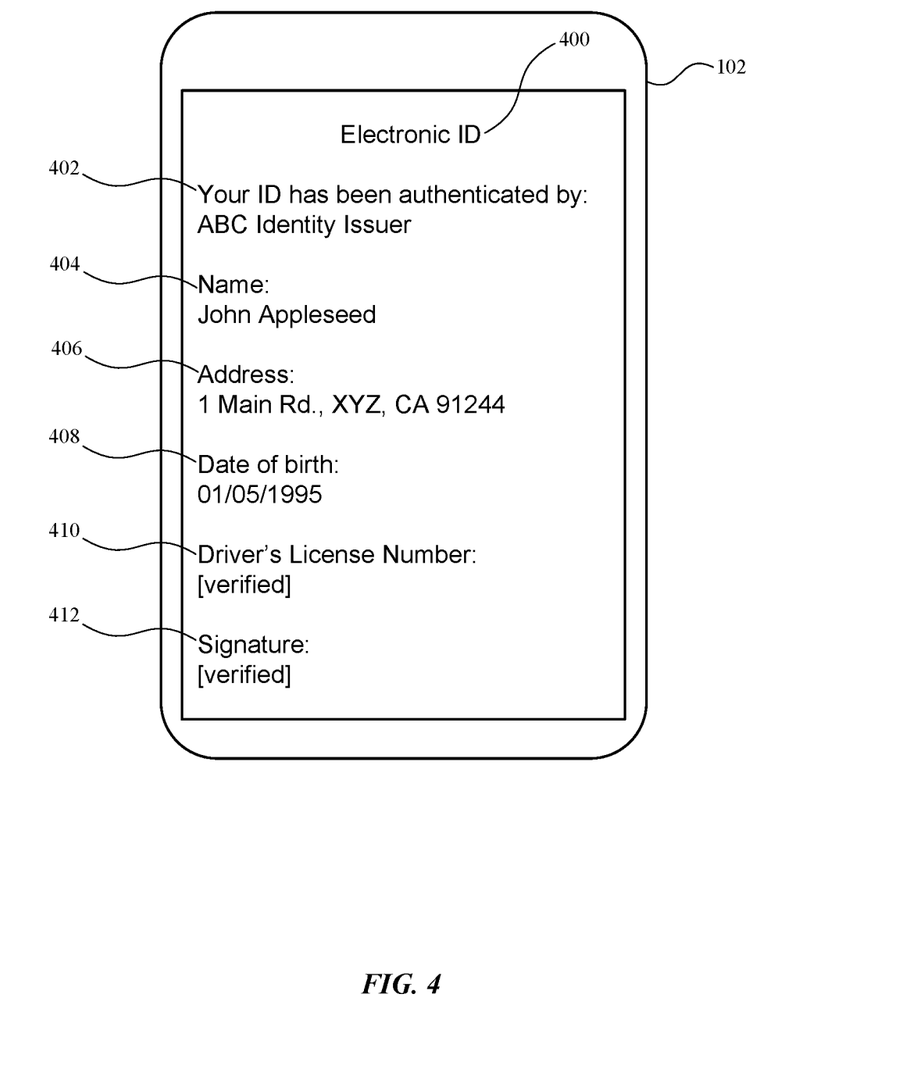
FIG. 4 illustrates an example of an electronic ID in accordance with one or more implementations.

In one or more implementations, the electronic ID is a digital certificate that includes user information (e.g., name, address, date of birth) that has been verified by the identity provider 108. The electronic ID may be generated by the electronic device 102 or by another server (e.g., the identity provider or another independent service). FIG. 4 illustrates an example of the fields within an electronic ID 400. The electronic ID 400 may include one or more fields that identify a user and correspond to content printed on a physical ID (e.g., a driver's license). The one or more fields may include, but are not limited to: the agency/organization 402 that authenticated the ID (e.g., the identity provider 108); the user's name 404; the user's address 406; the user's date of birth 408; the user's ID number 410 (e.g., a driver's license number, which may appear as "verified," or alternatively as plain text); the user's signature 412 (e.g., which may appear as "verified," or alternatively as an image of the user's signature).

Referring to FIG. 3, the electronic device 102 captures first image data of the ID (304). For example, the user may use the electronic device 102 to take a picture of his/her physical ID. More specifically, the image sensor(s) 208 of the electronic device 102 may be used to capture and generate the first image data corresponding to the ID. Thus, the first image data may include RGB data and/or infrared data corresponding to the ID. For example, the first image data may include color, depth, 2D and/or 3D characteristics of the ID.

Figure 5:
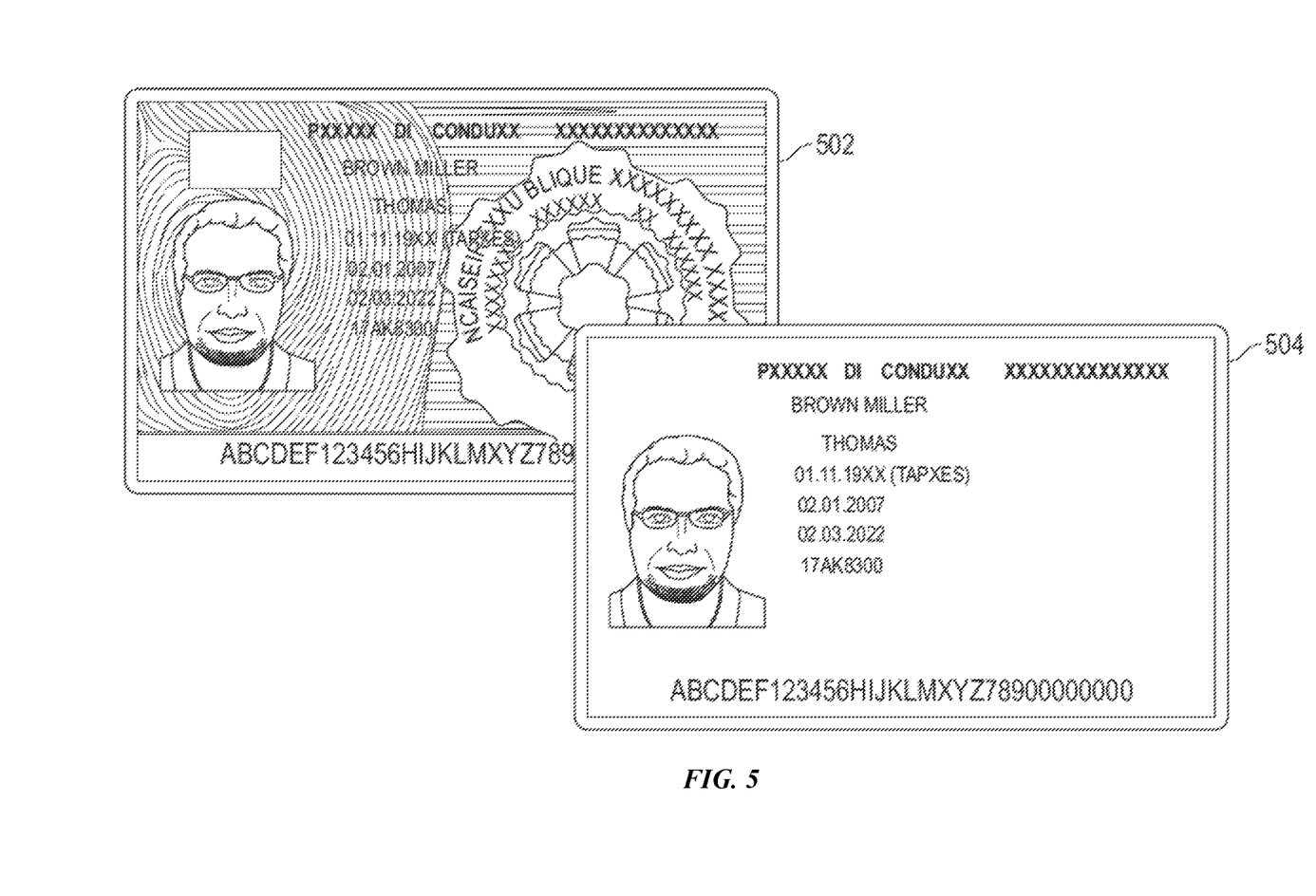
FIG. 5 illustrates an example of different image data that may be used in authenticating an ID in accordance with one or more implementations.

FIG. 5 illustrates an example of different image data that may be used for authenticating an ID. For example, the ID illustrated in FIG. 5 may correspond to a polycarbonate ID, which may include 3D content (e.g., engravings).

In the example of FIG. 5, the image data includes two images 502, 504 of the same ID. These images 502, 504 may be used in authenticating the ID. The image 502 corresponds to an RGB image (e.g., captured by an RGB image sensor) from which common security features (e.g., discussed below with respect to FIG. 6) of the ID can be determined. Image 504 corresponds to an infrared image (e.g., captured by an infrared image sensor) from which printed information specific to the user (e.g., name, address, date of birth and/or other data fields corresponding the electronic ID 400) and/or 3D content (e.g., engravings) can be determined.

The electronic device 102 sends a request to authenticate an ID, together with the first image data of the ID, to the identity provider 108 (306). As noted above, the identity provider 108 may correspond to an issuer of the ID (e.g., an agency/organization for issuing IDs corresponding to the user's ID), or a third-party service for verifying IDs. The electronic device 102 may sign the request with a private key (e.g., stored in the secure processor 210 or in the memory 204) of a public-private key pair. The identity provider 108 receives the request and the first image data from the electronic device 102 (308).

Figure 6:
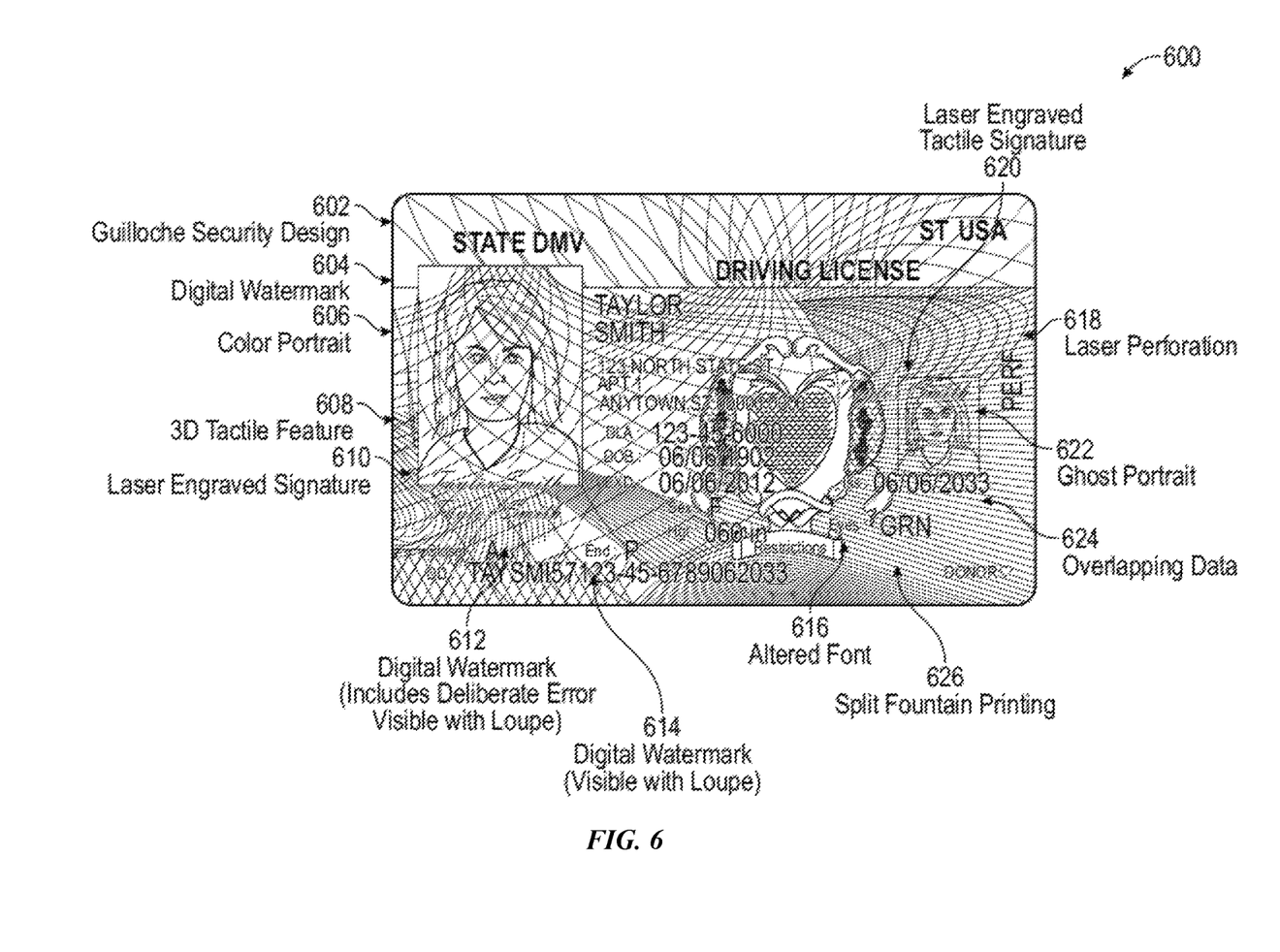
FIG. 6 illustrates an example of security features and user information that may be included on an ID in accordance with one or more implementations.

The identity provider 108 authenticates the ID (310). In doing so, the identity provider 108 may confirm various security features and/or user information appearing on the ID based on the first image data (e.g., the images 502, 504) as provided by the electronic device 102. FIG. 6 illustrates an example of security features and user information that may be included on an ID 600 in accordance with one or more implementations. In the example of FIG. 6, the ID 600 is a driver's license which includes multiple security features.

The security features and user information of the ID 600 may include but are not limited to: a guilloche security design 602; a digital watermark 604; a color portrait 606; a 3D tactile feature 608; a laser engraved signature 610; a first digital watermark 612 (e.g., which includes a deliberate error and is visible with a loupe); a second digital watermark 614 (e.g., which is visible with a loupe); an altered font 616; a laser perforation 618; a laser engraved tactile signature 620; a ghost portrait 622; overlapping data 624; and a split fountain printing 626. Some of the security features (e.g., elements 602, 604, 608, 612, 614, 616, 618, 626) may be common to all IDs issued by an issuer (e.g., the identity provider 108). On the other hand, some content (e.g., elements 606, 610, 620, 622, 624) may be unique to a specific ID, for example, as they relate to features specific to a user.

The elements 602-626 as illustrated in FIG. 6 are examples of security features and/or user information that may be included within a user's ID. It is possible for different, fewer or more security features and/or other user information to be incorporated within a user's ID for authentication by the identity provider 108.

To authenticate an ID, the identity provider 108 may compare one or more of the security features in the image(s) of the ID as provided by the electronic device 102 against predefined, common values. For example, the identity provider 108 may be configured to compare feature(s) that are common to all (or most) IDs issued by the issuer against the corresponding features in the received ID. In performing the comparison, the identity provider 108 may determine whether or not one or more characteristics of the common features, including but not limited to position, color, size, shape, texture and/or depth, match an expected value (e.g., a predefined value) corresponding to the common feature.

In a case where the identity provider 108 determines that the common security features of the user's ID are authentic (e.g., based on the first image data provided by the electronic device 102), the identity provider 108 may, in one or more implementations, further confirm the user's personal information as it appears on the ID. For example, in the case where the identity provider 108 is an agency which issued the ID, the identity provider 108 may perform optical character recognition (OCR) of the ID. OCR may be used to extract information from the ID which identifies the user (e.g., name, address, date of birth, portrait). The identity provider may compare this information against values in its own database (e.g., an agency database) which stores identifying information for multiple individuals to which physical IDs have been issued (e.g., all individuals in a state with a driver's license). Thus, the identity provider 108 may be further configured to determine that the information appearing on the ID matches the information in an agency database corresponding to the ID, such as based on a serial number or a unique identifier printed on the ID.

Based on the confirmation that the security features of the ID are authentic, and/or that the personal information appearing on the ID matches an individual's record (e.g., per an agency database), the identity provider 108 may indicate that the ID is an authentic ID. For example, the identity provider 108 may provide, to the electronic device 102, a signed verification that the ID has been verified (312). The signed verification may indicate the public key of the public-private key pair, such that the signed verification is specifically tied to the electronic device 102. The electronic device 102 may generate and save an electronic ID (e.g., such as in the secure processor 210) based on the signed verification (314). As noted above with respect to FIG. 4, the electronic ID (e.g., element 400) may correspond to a digital certificate that includes user information (e.g., name, address, date of birth) that has been verified by the identity provider 108, and that may further identify the identity provider (e.g., the issuer that authenticated the ID).

As a further part of the enrollment process, the electronic device 102 may then generate a first representation of the ID, and store the first representation (316), such as in a secure processor (e.g., the secure processor 210) or in the memory 204. Alternatively or in addition, the first representation may be remotely stored (e.g., on a server) in a secure manner. The first representation does not list or display the personally identifiable information of the ID. For example, the first representation may correspond to various form factors that relate to specific features of the user's ID relative to the common security features of the ID. The form factors may correspond to a position of selected characters in the ID (e.g., the position of the first and/or last characters of text within one or more of the name, address and/or date of birth fields) relative to common security features in the ID (e.g., watermarks and/or other regular designs).

Using the example of ID 600, the distance from predefined character position(s) (e.g., the first, middle or the last character of the user's name, address and/or signatures 610, 620) to common security features (e.g., elements 602, 604, 608, 612, 614, 616, 618, 626) may be calculated and stored as part of the first representation. Alternatively or in addition, the distance from predefined part(s) of the face (e.g., the leftmost, rightmost, center, and/or the nose, eyes, ears, chin) to common security features (e.g., elements 602, 604, 608, 612, 614, 616, 618, 626) may be determined and stored as part of the first representation. In one or more implementations, the first representation may be, and/or may include, a hash of the image and/or a hash of the form factors.

In one or more implementations, as an alternative or addition to measured distances, the form factors may relate to one or more other measured values specific to the user's ID, for example, where personally identifiable information cannot be determined from the measured values. For example, one or more of color measurements at a predefined position of the user's face (e.g., pixel(s) at the center of a photo), the thickness of a signature line at a predefined position (e.g., the last character), and/or depth information of a signature line (e.g., engraved and/or raised) at a predefined position (e.g., last character) may be calculated and stored as part of the first representation. Other measurements may also be used to and stored as part of the first representation, for example, using techniques similar to those used in biometric processing with respect to uniquely identifying subjects.

In this manner, the first representation is a representation of the electronic ID 400 that may be unique to the ID (e.g., measured distances relative to common features of the ID and/or other measured values). Moreover, user identifying information cannot be determined from the first representation.

After generating the first representation, the electronic device 102 may store the first representation (e.g., in the secure processor 210). For example, the secure processor 210 may prevent a user from modifying the first representation, such that the first representation as stored is immutable. Alternatively or in addition, the first representation may be stored on a remote server in a secure manner (e.g., so as not to be modifiable by the user). As shown in FIG. 3, the generating and saving of the first representation may correspond to a completion of the enrollment phase.

As noted above, blocks 318-338 may correspond to a sharing phase, in which the electronic device 102 may share the electronic ID with a service provider 110, in association with performing transactions with the service provider 110. For example, the electronic device 102 may receive user input to perform an on-line transaction that requires an ID (318). Examples of such a transaction include, but are not limited to: on-line purchases that require the purchaser to be a minimum age (e.g., food drink, tickets, hotel rooms); opening a bank account; applying for public benefits; applying for a loan (e.g., car, house); a phone-based transaction requiring a text/email to verify the identity of a user based on a physical ID; and/or any other service that may require that the identity of a user be verified based on a physical ID. Thus, the electronic device 102 initially sends the request for the transaction to the service provider 110 (320), and the service provider 110 receives the request (322).

In a case where the nature of the transaction requires an ID, the service provider 110 sends a request for the ID to the electronic device 102 (324). For example, the service provider 110 may request the electronic ID from the electronic device. Moreover, the request for the electronic ID may include a nonce to be signed by the electronic device 102, using the private key of the electronic device 102. The electronic device 102 receives the request (326).

Before providing the electronic ID to the service provider 110, the electronic device 102 may require the user to confirm that the physical ID in possession of the user matches the ID that was previously authenticated by the identity provider 108. The electronic device 102 may require that the user re-take a photo of his/her ID for comparison against the first representation of the ID (e.g., as stored in the secure processor 210 of the electronic device 102 and/or in remote storage). In response, the user may take a current picture of the ID, corresponding to second image data (328) of the ID.

Similar to the type of data captured with respect to the first image data, the second image data may include RGB image data (e.g., as captured by an RGB sensor) and/or infrared image data (e.g., as captured by an infrared sensor). The second image data may include common security features of the ID as well as personal information of the user extracted from the ID.

Moreover, the electronic device 102 generates a second representation of the ID, based on the second image data (330). Similar to the first representation, the second representation may correspond to various form factors. For example, the form factors may include measured distances between common security features and particular characters and/or portions of the user's face, measured color values at positions, and/or thickness/depth information at predefined positions.

The electronic device 102 compares the first and second representations (332). As noted above, the first representation may be stored in a secure processor of the device (e.g., the secure processor 210) or remotely stored in a secure manner, such that the measurements are not modifiable by the user. Thus, the electronic device may determine whether the second image data (e.g., the recent photo of the ID) matches the first image data (e.g., the authenticated photo of the ID) with a fair amount of certainty (e.g., given the immutable nature of the first representation).

In one or more implementations, the electronic device 102 may compare each of the measurements (e.g., distance, color, thickness and the like) in the first representation with respective measurements in the second representation. Mismatches in these values may suggest that the recently-photographed ID is different than the authenticated ID, or that the recently-photographed ID has been modified since being authenticated.

Thus, if the measured values do not match, or are not within a predefined tolerance (e.g., threshold difference) of each other, the electronic device 102 may determine that the second image data (e.g., the recent photo of the ID) does not correspond with the authenticated ID. In such a case, the electronic device 102 may not provide the electronic signature to the service provider 110.

If the measure values do match, or are within a predefined tolerance (e.g., threshold difference) each other, the electronic device 102 may determine that the second image data (e.g., corresponding to the recent photo of the ID) matches the first image data (e.g., corresponding to the prior photo of the authenticated ID). Thus, the electronic device 102 may determine that the user is in possession of a valid ID sufficient for completing a transaction with the service provider 110. The electronic device 102 may sign the nonce (e.g., if provided by the service provider 110) using the private key stored on the electronic device 102. The electronic device 102 provides the electronic ID to the service provider 110 (334), and the service provider 110 receives the electronic ID (336).

The service provider 110 may determine, based on the information provided within the electronic ID (e.g., the indication of authentication by the issuer, together with the user's name, address and/or date of birth), that the user's current ID is authentic. Thus, the service provider 110 may proceed with performing the transaction (338) with the electronic device 102 (e.g., completing an on-line sale of a product/service).

Figure 7:
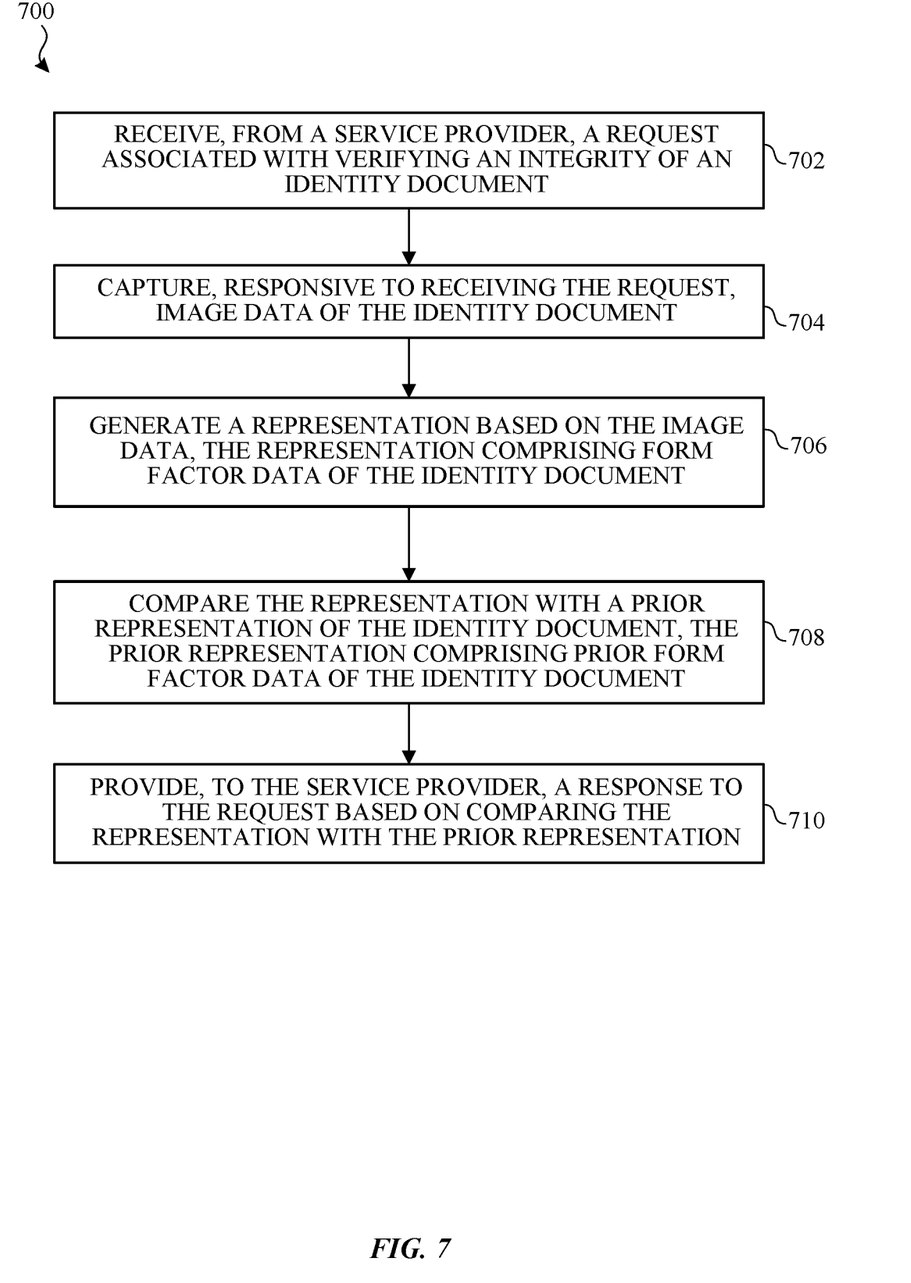
FIG. 7 illustrates a flow diagram of an example process for authenticating an ID in accordance with one or more implementations.

FIG. 7 illustrates a flow diagram of an example process for authenticating an ID in accordance with one or more implementations. For explanatory purposes, the process 700 is primarily described herein with reference to the electronic device 102, the identity provider 108 and the service provider 110 of FIG. 1. However, the process 700 is not limited to the electronic device 102, the identity provider 108 and the service provider 110 of FIG. 1, and one or more blocks (or operations) of the process 700 may be performed by one or more other components and other suitable devices (e.g., any of the electronic devices 103-104). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives, from the service provider 110, a request associated with verifying an integrity of an identity document (702). The service provider 110 may be an on-line merchant.

Prior to the receiving, the electronic device 102 may: provide, to the identity provider 108, a request to authenticate the identity document, the request comprising prior image data of the identity document; receive, from the identity provider 108, an indication that the identity document has been authenticated based on the prior image data; and generate, responsive to receiving the indication, the prior representation of the identity document based on the prior image data; and store the prior representation. The identity provider 108 may correspond to an organization for issuing identity documents corresponding to the identity document.

The storing may include storing the prior representation in the secure processor 210 (or in the memory 204, or in remote storage). The indication that the identity document has been authenticated may include a signed verification (e.g., signed by the identity provider) that is tied to a device by a public key of a public-private key pair, a private key of which is stored on the electronic device 102 (e.g., in the secure processor 210 or in the memory 204).

The electronic device 102 captures, responsive to receiving the request, image data of the identity document (704). The electronic device 102 generates a representation based on the image data, the representation comprising form factor data of the identity document (706).

The electronic device 102 compares the representation with the prior representation of the identity document, the prior representation comprising prior form factor data of the identity document (708). The form factor data and the prior form factor data may indicate a position of a common security feature of the identity document relative to a specific feature of the identity document.

Each of the image data and the prior image data may include RGB image data, and the form factor data and the prior form factor data may be based on the respective RGB image data. Alternatively or in addition, each of the image data and the prior image data may include infrared image data, and the form factor data and the prior form factor data may be based on the respective infrared image data. The electronic device 102 provides, to the service provider 110, a response to the request based on comparing the representation with the prior representation (710).

As described above, one aspect of the present technology is the gathering and use of data available from specific and legitimate sources to authenticate an ID. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to authenticate an ID. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of authenticating an ID, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
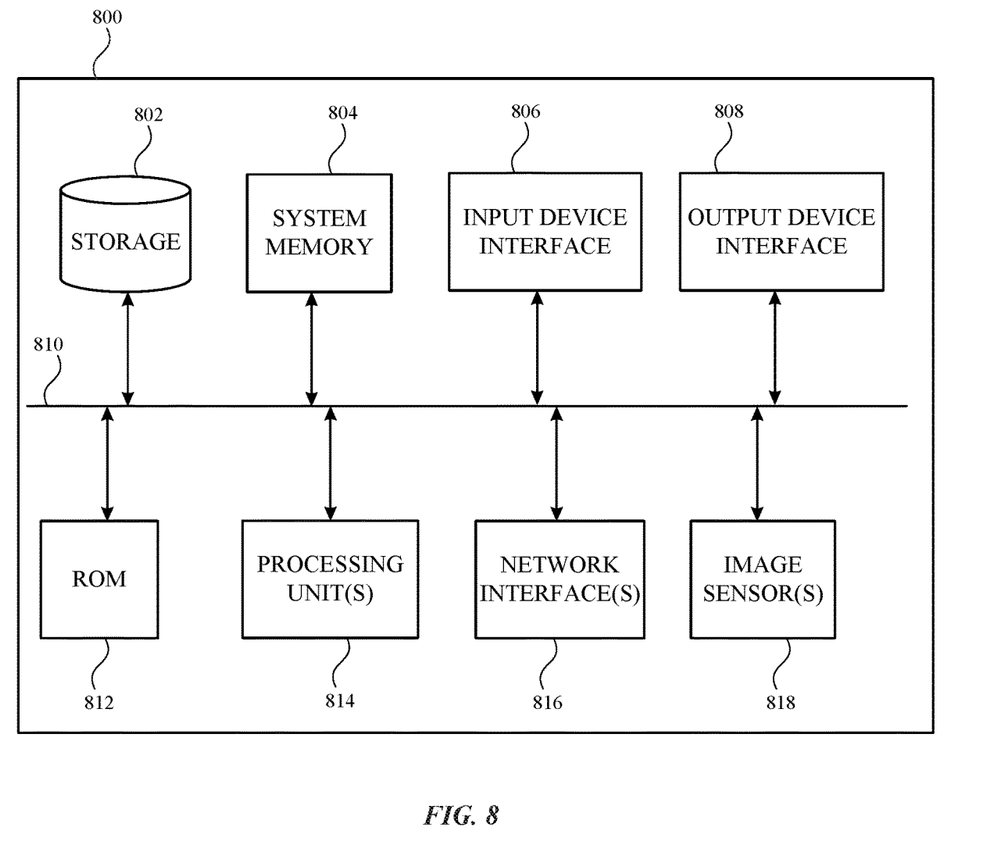
FIG. 8 illustrates an example electronic system with which aspects of the subject technology may be implemented in accordance with one or more implementations.

FIG. 8 illustrates an example electronic system with which aspects of the subject technology may be implemented in accordance with one or more implementations. The electronic system 800 can be, and/or can be a part of, any electronic device or server for generating the features and processes described in reference to FIGS. 1-2, including but not limited to a laptop computer, tablet computer, smartphone, and wearable device (e.g., smartwatch, fitness band). The electronic system 800 may include various types of computer readable media and interfaces for various other types of computer readable media. The electronic system 800 includes a permanent storage device 802, a system memory 804 (and/or buffer), an input device interface 806, an output device interface 808, a bus 810, a ROM 812, one or more processing unit(s) 814, one or more network interface(s) 816, image sensor(s) 818, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the electronic system 800. Input devices that may be used with the input device interface 806 may include, for example, alphanumeric keyboards and pointing devices (also called "cursor control devices"). The output device interface 808 may enable, for example, the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to the image sensor(s) 818. In one or more implementations, the image sensor(s) 820 may be utilized to capture image data, including but not limited to RGB image data or infrared image data.

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
providing, to an identity provider, a request to authenticate an identity document, the request comprising prior captured image data of the identity document;
receiving, from the identity provider, an indication that the identity document has been authenticated based on the prior captured image data;
generating, responsive to receiving the indication, a prior representation of the identity document based on the prior captured image data;
storing the prior representation;
receiving, from a service provider and after the storing, a request associated with verifying an integrity of the identity document;
capturing, responsive to receiving the request, image data of the identity document;
generating a representation based on the image data, the representation comprising form factor data of the identity document;
comparing the representation with the prior representation of the identity document, the prior representation comprising prior form factor data of the identity document; and
providing, to the service provider, a response to the request based on comparing the representation with the prior representation.

2. The method of claim 1, wherein the storing comprises storing the prior representation in a secure processor of a device.

3. The method of claim 1, wherein the form factor data indicates a position of a common security feature of the identity document relative to a specific feature of the identity document.

4. The method of claim 1, wherein the image data comprises RGB image data, and the form factor data is based on the RGB image data.

5. The method of claim 1, wherein the image data comprises infrared image data, and the form factor data is based on the infrared image data.

6. The method of claim 1, wherein the identity provider corresponds to an organization for issuing identity documents corresponding to the identity document.

7. The method of claim 1, wherein the indication that identity document has been authenticated comprises a signed verification that is tied to a device by a public key of a public-private key pair, a private key of which is stored on the device.

8. The method of claim 1, wherein the service provider corresponds to an on-line merchant.

9. The method of claim 1, wherein the representation and the prior representation do not indicate personally identifiable information.

10. A device, comprising:
at least one processor; and
a memory including instructions that, when executed by the at least one processor, cause the at least one processor to:
provide, to an identity provider, a request to authenticate an identity document, the request comprising prior captured image data of the identity document;
receive, from the identity provider, an indication that the identity document has been authenticated based on the prior captured image data;
generate, responsive to receipt of the indication, a prior representation of the identity document based on the prior captured image data; and
store the prior representation;
receive, from a service provider and after the prior representation is stored, a request associated with verifying an integrity of the identity document;
capture, responsive to receiving the request, image data of the identity document;
generate a representation based on the image data, the representation comprising form factor data of the identity document;
compare the representation with a the representation of the identity document, the prior representation comprising prior form factor data of the identity document; and
provide, to the service provider, a response to the request based on comparing the representation with the prior representation.

11. The device of claim 10, wherein the storing comprises storing the prior representation in a secure processor of the device.

12. The device of claim 10, wherein the form factor data and the prior form factor data indicate a position of a common security feature of the identity document relative to a specific feature of the identity document.

13. The device of claim 10, wherein each of the image data and the prior image data comprises RGB image data, and
wherein the form factor data and the prior form factor data are based on the respective RGB image data.

14. The device of claim 10, wherein each of the image data and the prior image data comprises infrared image data, and
wherein the form factor data and the prior form factor data are based on the respective infrared image data.

15. The device of claim 10, wherein the identity provider corresponds to an organization for issuing identity documents corresponding to the identity document.

16. The device of claim 10, wherein the indication that the identity document has been authenticated comprises a signed verification that is tied to the device by a public key of a public-private key pair, a private key of which is stored on the device.

17. The device of claim 10, wherein the service provider corresponds to an on-line merchant.

18. The device of claim 10, wherein the representation and the prior representation do not indicate personally identifiable information.

19. A computer program product comprising code stored in a non-transitory computer-readable storage medium, the code comprising:
code to provide, to a first service, a request to authenticate an identity document, the request comprising first captured image data of the identity document;
code to receive, from the first service, an indication that the identity document has been authenticated based on the first captured image data;

code to generate, responsive to receiving the indication, a first representation based on the first captured image data;

code to store the first representation;

code to receive, from a second service and after the first representation is stored, a request associated with verifying an integrity of the identity document;

code to, responsive to the request,
capture second image data of the identity document,
generate a second representation based on the second captured image data;

code to compare the second representation with the first representation of the identity document, the first representation comprising first form factor data of the identity document; and code to provide, to the second service, a response to the request based on the compare of the first and second representations.

20. The computer program product of claim 19, wherein the first and second representations do not indicate personally identifiable information.

\* \* \* \* \*

UNITED STATES PATENT AND TRADEMARK OFFICE
CERTIFICATE OF CORRECTION

| | |
|---|---|
| PATENT NO. | : 11,494,574 B2 |
| APPLICATION NO. | : 16/805214 |
| DATED | : November 8, 2022 |
| INVENTOR(S) | : Mathieu Ciet et al. |

It is certified that error appears in the above-identified patent and that said Letters Patent is hereby corrected as shown below:

In the Claims

Column 18, Line 22 (Claim 10): Replace "compare the representation with a the representation of", with --compare the representation with the representation of--

Signed and Sealed this
Nineteenth Day of September, 2023

Katherine Kelly Vidal
*Director of the United States Patent and Trademark Office*